May 23, 1961 D. A. FLUEGEL 2,985,826
ELECTRICAL MEASURING APPARATUS
Filed Nov. 19, 1959
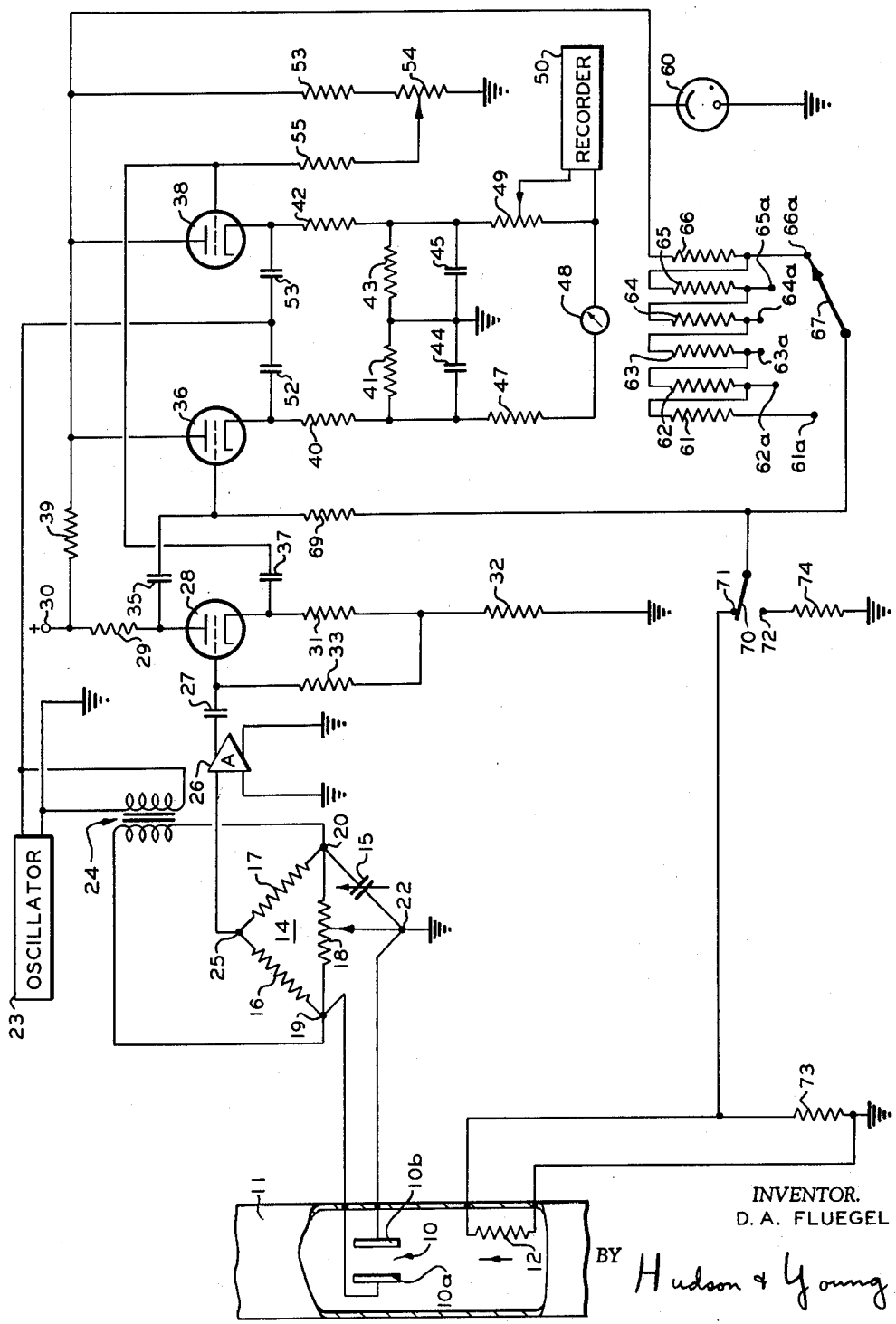
INVENTOR.
D. A. FLUEGEL
BY Hudson & Young
ATTORNEYS United States Patent Office 2,985,826
Patented May 23, 1961

2,985,826
ELECTRICAL MEASURING APPARATUS
Dale A. Fluegel, Bartlesville, Okla., assignor to Phillips Petroleum Company, a corporation of Delaware
Filed Nov. 19, 1959, Ser. No. 854,055
5 Claims. (Cl. 324—61)

This invention relates to the detection and analysis of fluids in terms of the dielectric properties thereof.

The measurement of the dielectric properties of material has become a valuable industry and laboratory procedure for determining compositions. One specific application of this procedure occurs in automatic custody transfer systems which are presently being developed to transfer crude oil from storage units automatically to a pipeline. One of the measurements required in such a system is a determination of the basic sediment and water content of the crude oil. It has been found that this measurement can be made by the use of a capacitance probe which is inserted into the oil to be measured. The presence of basic sediment and water in the crude oil changes the dielectric constant of the oil which in turn changes the capacitance of the measuring probe. While this system accurately measures the basic sediment and water in the crude oil, serious errors are likely to occur if the crude oil changes temperature because the dielectric constant of the oil is a function of temperature.

Various systems have been proposed in an attempt to solve this problem in measuring basic sediment and water in crude oil. However, a simple and reliable solution to the problem apparently has not been found prior to this invention. In accordance with this invention, a temperature sensitive resistance element is positioned adjacent the capacitor probe so as to be in thermal contact therewith. This temperature sensitive resistance element is connected to a voltage dividing network so that a bias signal is applied to the detecting circuit in such a manner as to compensate for any changes in temperature of the fluid being measured. Thus, the output signal of the detecting circuit provides an accurate measurement of the dielectric constant of the test fluid.

Accordingly, it is an object of this invention to provide improved apparatus for detecting and analyzing fluids in terms of the dielectric properties thereof.

A further object is to provide improved apparatus for measuring the basic sediment and water content of crude oil.

A further object is to provide a temperature compensating circuit for use in measuring the dielectric properties of a test fluid.

Other objects, advantages and features of this invention should become apparent from the following detailed description, in conjunction with the accompanying drawing which is a schematic circuit diagram of the capacitance measuring circuit.

Referring now to the drawing in detail, there is shown a pair of spaced electrodes 10a and 10b which form a capacitor 10. This capacitor is disposed within a pipe 11 so that fluid flowing through the pipe forms the dielectric of the capacitor. Pipe 11 can transfer crude oil, for example, when it is desired to measure the basic sediment and water content of such crude oil. Electrodes 10a and 10b can be any desired configuration which forms a capacitor. It should be evident that these electrodes can be spaced plates, as illustrated, or in the form of a central cylindrical electrode surrounded by a hollow cylinder, for example. A temperature sensitive resistance element 12 is positioned within pipe 11 so as to be closely spaced to capacitor 10. Resistance element 12 is thus in thermal contact with the fluid which forms the dielectric of the capacitor. This resistance element preferably is a thermistor which has a negative temperature coefficient of resistivity.

Capacitor 10 forms one arm of a bridge network 14. A reference capacitor 15 forms a second arm of the bridge network, and resistors 16 and 17 form the third and fourth arms of the bridge network. A potentiometer 18 is connected between the first pair of opposite terminals 19 and 20 of the bridge network. The contactor of potentiometer 18 is connected to a third bridge terminal 22 which is connected to ground. An oscillator 23 establishes an alternating signal which is applied through a transformer 24 across opposite terminals 19 and 20 of bridge network 14. Bridge terminals 25 and 22 are connected to the input terminals of an amplifier 26.

The first output terminal of amplifier 26 is connected through a capacitor 27 to the control grid of a triode 28. The anode of triode 28 is connected through a resistor 29 to a terminal 30 which is maintained at a positive potential. The cathode of triode 28 is connected to ground through series connected resistors 31 and 32. The control grid of triode 28 is connected through a resistor 33 to the junction between resistors 31 and 32. The second output terminal of amplifier 26 is connected to ground.

The anode of triode 28 is connected through a capacitor 35 to the control grid of a second triode 36, and the cathode of triode 28 is connected through a capacitor 37 to the control grid of a third triode 38. The anodes of triodes 36 and 38 are connected through a common resistor 39 to potential terminal 30. The cathode of triode 36 is connected to ground through series connected resistors 40 and 41, and the cathode of triode 38 is connected to ground through series connected resistors 42 and 43. Capacitors 44 and 45 are connected in parallel with respective resistors 41 and 43. A resistor 47 is connected between the first terminal of a current meter 48 and the junction between resistors 40 and 41. A potentiometer 49 is connected between the second terminal of meter 48 and the junction between resistors 42 and 43. A recorder 50 is connected between the contactor and one end terminal of potentiometer 49. The first output terminal of oscillator 23 is connected to the cathodes of triodes 36 and 38 through respective capacitors 52 and 53. The second output terminal of oscillator 23 is connected to ground.

The circuit thus far described comprises a conventional capacity bridge and a phase sensitive detector. It should be evident that a zero output signal appears between terminals 25 and 22 of the bridge network when the bridge is balanced. However, any unbalance of the bridge due to a change in capacitance of element 10 results in the potential of terminal 25 changing from ground potential. Any unbalance signal from the bridge is amplified by amplifier 26 and applied to the control grid of triode 28. Triode 28 provides two output signals which are 180° out of phase with one another. These two signals are applied to the control grids of triodes 36 and 38, respectively. Triodes 36 and 38 and the circuit elements associated therewith form a phase sensitive detector. A reference signal is applied to the cathodes of these triodes from oscillator 23. The input signals and the reference signal are of the same frequency because both are derived from oscillator 23. The currents through the two triodes 36 and 38 are thus functions of the amplitudes of the signals applied to the control grid of the triodes and the phases of these signals with respect to the reference signal applied to the cathodes. The resistors and capacitors in the cathode circuits of the two triodes serve to filter the currents through the triodes. If the capacitance of capacitor 10 should become greater than the capacitance of element 15, bridge network 14 is unbalanced in a first direction. If the capacitance of element 10 becomes less than the capacitance of element 15, the bridge is unbalanced in the opposite direction. The phase of the output signal from the bridge thus changes by 180° when the direction of the unbalance changes. The relative currents through triodes 36 and 38 are measured by meter 48 and recorder 50 to provide signals representative of the capacitance of element 10, which in turn is representative of the dielectric constant of the fluid in pipe 11.

Bridge network 14 is balanced initially by varying capacitor 15 and/or potentiometer 18 until the recorder reads zero, or a predetermined value as determined by the setting of the contactor of potentiometer 49, when a reference fluid is disposed between the plates of capacitor 10. The bridge circuit is then balanced and the apparatus is ready to be operated. Any change in capacitance of element 10 results in a change in the signal applied to recorder 50.

A resistor 53 and a potentiometer 54 are connected in series relationship between the anode of triode 38 and ground. A voltage regulating gas-filled diode 60 is connected between the anode of triode 38 and ground. The contactor of potentiometer 54 is connected through a resistor 55 to the control grid of a triode 38. This network thus serves to apply a predetermined bias potential to the control grid of triode 38. The bias potential can be adjusted by movement of the contactor of potentiometer 54 to establish a zero reference point of the phase sensitive detector.

Six resistors 61, 62, 63, 64, 65 and 66 are connected in series relationship. Corresponding first terminals of these resistors are connected to respective terminals 61a, 62a, 63a, 64a, 65a and 66a which are adapted to be engaged selectively by a switch 67. The second terminal of resistor 66 is connected to the cathode of regulating tube 60. Switch 67 is connected to a switch 70 and to the first terminal of a resistor 69. The second terminal of resistor 69 is connected to the control grid of triode 36. Switch 70 is adapted to engage terminals 71 and 72 selectively. Temperature sensitive resistance element 12 is connected between terminal 71 and ground. A resistor 73 is connected in parallel with element 12. A resistor 74 is connected between terminal 72 and ground.

It should be evident that the bias potential applied to the control grid of triode 36 is a function of the resistance connected in the voltage dividing circuit by switches 67 and 70. In normal operation, switch 70 engages terminal 71 so that resistance element 12 is connected in the circuit. The resistance of element 12 changes as a function of temperature so that the bias potential applied to the control grid of triode 36 also changes as a function of temperature. The values of the circuit elements in this voltage regulating circuit are selected so that this bias potential changes as a linear function of the change in capacitance of element 10 with a change in temperature and the fluid being measured. The amount of resistance connected in this circuit by means of switch 67 varies with different types of materials being measured. As previously discussed, element 12 preferably has a negative coefficient of thermal resistivity. Resistor 73 is employed so that the total change in resistance of parallel connected elements 12 and 73 as a function of temperature is substantially linear. Resistance element 74 is a reference element which is connected in the circuit periodically in place of element 12 in order to calibrate the circuit.

In one specific embodiment of this invention, element 12 was a Bendix-Friez 52–337–1 thermistor. The resistance elements in the voltage dividing network had the following values:

| Element: | Resistance (ohms) |
|---|---|
| 61 | 22,000 |
| 62 | 16,000 |
| 63 | 12,000 |
| 64 | 9,000 |
| 65 | 7,500 |
| 66 | 65,000 |
| 69 | 470,000 |
| 73 | 2,700 |
| 74 | 1,500 |

In the absence of a signal from bridge network 14, the output signal applied to recorder 50 was a linear function of the bias potential applied to the control grid of triode 36. Calibrating resistor 74 was equivalent to the resistance of elements 12 and 73 when element 12 was at a temperature of 100° F.

While the invention has been described in conjunction with a present preferred embodiment, it should be evident that it is not limited thereto.

What is claimed is:

1. Measuring apparatus comprising first and second spaced electrodes forming a first capacitor, the region between said electrodes being adapted to receive a fluid to be measured, a temperature sensitive resistance element positioned adjacent said electrodes so as to be in thermal contact with fluid between said electrodes, a bridge network having said first capacitor in one arm thereof, means to apply an alternating electrical signal across first opposite terminals of said bridge network, a phase sensitive detector having first and second inputs, means applying the output signal from second opposite terminals of said bridge network to respective inputs of said detector, means to apply said alternating signal as a reference signal to said detector, means to apply a first bias potential to said first input of said detector, means to apply a second bias potential to said second input of said detector, and means including said temperature sensitive resistance element to vary said second bias potential as a function of temperature changes of said resistance element to eliminate changes in the output of said detector due to changes in temperature of the fluid to be measured.

2. The measuring apparatus of claim 1 wherein said means to apply said second bias potential and said means to vary said second bias potential comprise a source of direct potential, a resistor connected in series with said resistance element between the terminals of said source of direct potential, and means connecting the junction between said resistor and said resistance element to said second input terminal of said detector.

3. The measuring apparatus of claim 2 wherein said resistance element has a negative coefficient of thermal resistivity, and further comprising a second resistor connected in parallel with said resistance element.

4. Measuring apparatus comprising first and second spaced electrodes forming a first capacitor, the region between said electrodes being adapted to receive a fluid to be measured, a temperature sensitive resistance element positioned adjacent said electrodes so as to be in thermal contact with fluid between said electrodes, a bridge network having said first capacitor in one arm thereof, means to apply an alternating electrical signal across first opposite terminals of said bridge network, first and second electron tubes each having an anode, a cathode and a control grid, a source of direct potential, means connecting the anodes of said tubes to the positive terminal of said source of direct potential, first and second resistors connected between the cathode of said first tube and the negative terminal of said source of direct potential, third and fourth resistors connected between the cathode of said second tube and the negative terminal of said source of direct potential, means connected across second opposite terminals of said bridge network to establish first and second output signals of opposite phase, means connecting said first and second signals to the control grids of said first and second tubes, respectively, means to apply said alternating signal as a reference signal to the cathodes of said tubes, means to apply a first bias potential to the control grid of said first tube, means to apply a second bias potential to the control grid of said second tube, means to compare the currents through said first and second tubes to establish an output signal representative of the dielectric constant of the fluid to be measured, and means including said temperature sensitive resistance element to vary said second bias potential as a function of temperature changes of said resistance element to eliminate changes in said output signal due to changes in temperature of the fluid to be measured.

5. Measuring apparatus comprising first and second spaced electrodes forming a first capacitor, the region between said electrodes being adapted to receive a fluid to be measured, a temperature sensitive resistance element having a negative coefficient of thermal resistivity positioned adjacent said electrodes so as to be in thermal contact with fluid between said electrodes, a bridge network having said first capacitor in one arm thereof, means to apply an alternating electrical signal across first opposite terminals of said bridge network, first and second electron tubes each having an anode, a cathode and a control grid, a source of direct potential, means connecting the anodes of said tubes to the positive terminal of said source of direct potential, first and second resistors connected between the cathode of said first tube and the negative terminal of said source of direct potential, third and fourth resistors connected between the cathode of said second tube and the negative terminal of said source of direct potential, means connected across second opposite terminals of said bridge network to establish first and second output signals of opposite phase, means connecting said first and second signals to the control grids of said first and second tubes, respectively, means to apply said alternating signal as a reference signal to the cathodes of said tubes, means to apply a first bias potential to the control grid of said first tube, a variable resistor, means connecting said variable resistor and said resistance element in series across said source of direct potential, means connecting the junction between said variable resistor and said resistance element to the control grid of said second tube, a fifth resistor connected in parallel with said resistance element, and current indicating means connected between the junction between said first and second resistors and the junction between said third and fourth resistors.

References Cited in the file of this patent

UNITED STATES PATENTS

| | | |
|---|---|---|
| 2,724,273 | Southeimer | Nov. 22, 1955 |
| 2,787,904 | Beard | Apr. 9, 1957 |
| 2,826,738 | Lupfer et al. | Mar. 11, 1958 |
| 2,866,337 | Minneman et al. | Dec. 30, 1958 |